Figure 1:
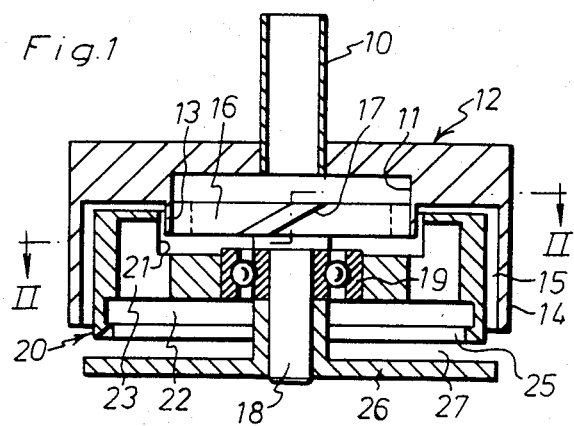

United States Patent [19]

Andersson

[11] Patent Number: 4,530,462
[45] Date of Patent: Jul. 23, 1985

[54] METHOD AND APPARATUS FOR SPREADING AND DISTRIBUTING A SOLID OR LIQUID PARTICULATE MATERIAL

[75] Inventor: Alf H. Andersson, Ödåkra, Sweden

[73] Assignee: Ingenjörsfirman Alf Andersson Handelsbolag, Ödåkra, Sweden

[21] Appl. No.: 515,301

[22] Filed: Jul. 19, 1983

[30] Foreign Application Priority Data

Jul. 27, 1982 [SE] Sweden ................................. 8204467

[51] Int. Cl.³ ........................ A01C 7/08; B01D 45/14
[52] U.S. Cl. ......................................... 239/7; 239/654;
239/684; 239/222.17; 406/181; 55/1; 55/317;
55/396; 55/398; 55/399; 55/405; 55/407;
55/409; 414/301
[58] Field of Search ..................... 55/1, 317, 318, 396,
55/398, 399, 400, 404–409, 423, 466; 414/301;
406/181; 193/23; 239/222.17, 224, 681, 684, 7,
654

[56] References Cited

U.S. PATENT DOCUMENTS

| 1,825,668 | 10/1931 | Kennedy | 406/181 |
| 1,981,421 | 11/1934 | Kreutzer | 414/301 |
| 2,447,119 | 8/1948 | Goodyer | 55/404 |
| 4,318,511 | 3/1982 | Clark | 239/684 |
| 4,373,940 | 2/1983 | Petersen | 55/398 |

FOREIGN PATENT DOCUMENTS

| 0102333 | 7/1984 | European Pat. Off. |  |
| 1203718 | 1/1960 | France | 55/400 |
| 303124 | 3/1930 | United Kingdom | 55/407 |
| 217105 | 7/1968 | U.S.S.R. | 239/681 |
| 703123 | 12/1979 | U.S.S.R. | 55/400 |

Primary Examiner—David L. Lacey
Attorney, Agent, or Firm—Trexler, Bushnell & Wolters, Ltd.

[57] ABSTRACT

A method and apparatus for separating, spreading and distributing a solid or liquid particulate material. The particulate material is pneumatically conveyed into a centrifugal chamber within a rotor (20) operatable by the flow of material for centrifugal separation of the particulate material. The terminal edge of the circumference of the centrifugal chamber serves as an overflow for establishing a buffer store and has a flow-retarding inwardly directed flange. A baffle may be provided around the terminal edge to intercept the material flung out and to conduct the material, via hopper-like flow-retarding recesses, to different outlets provided around the terminal edge.

14 Claims, 6 Drawing Figures

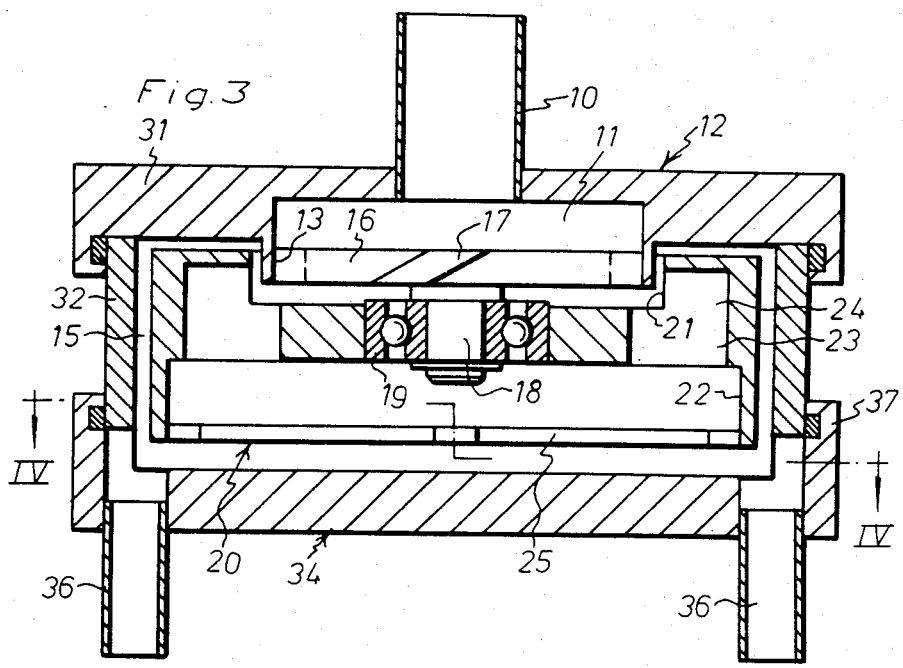
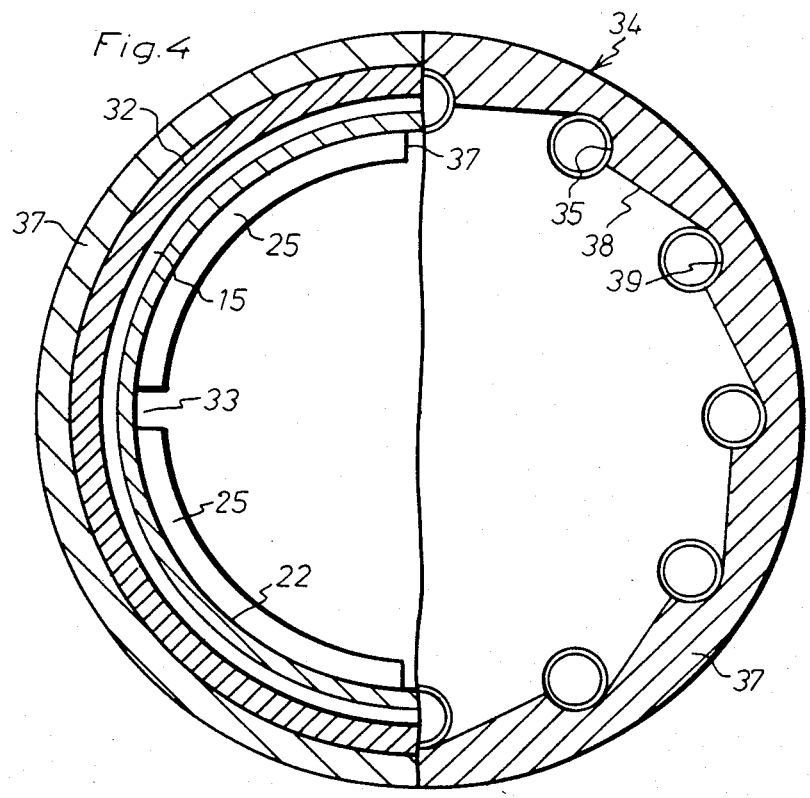

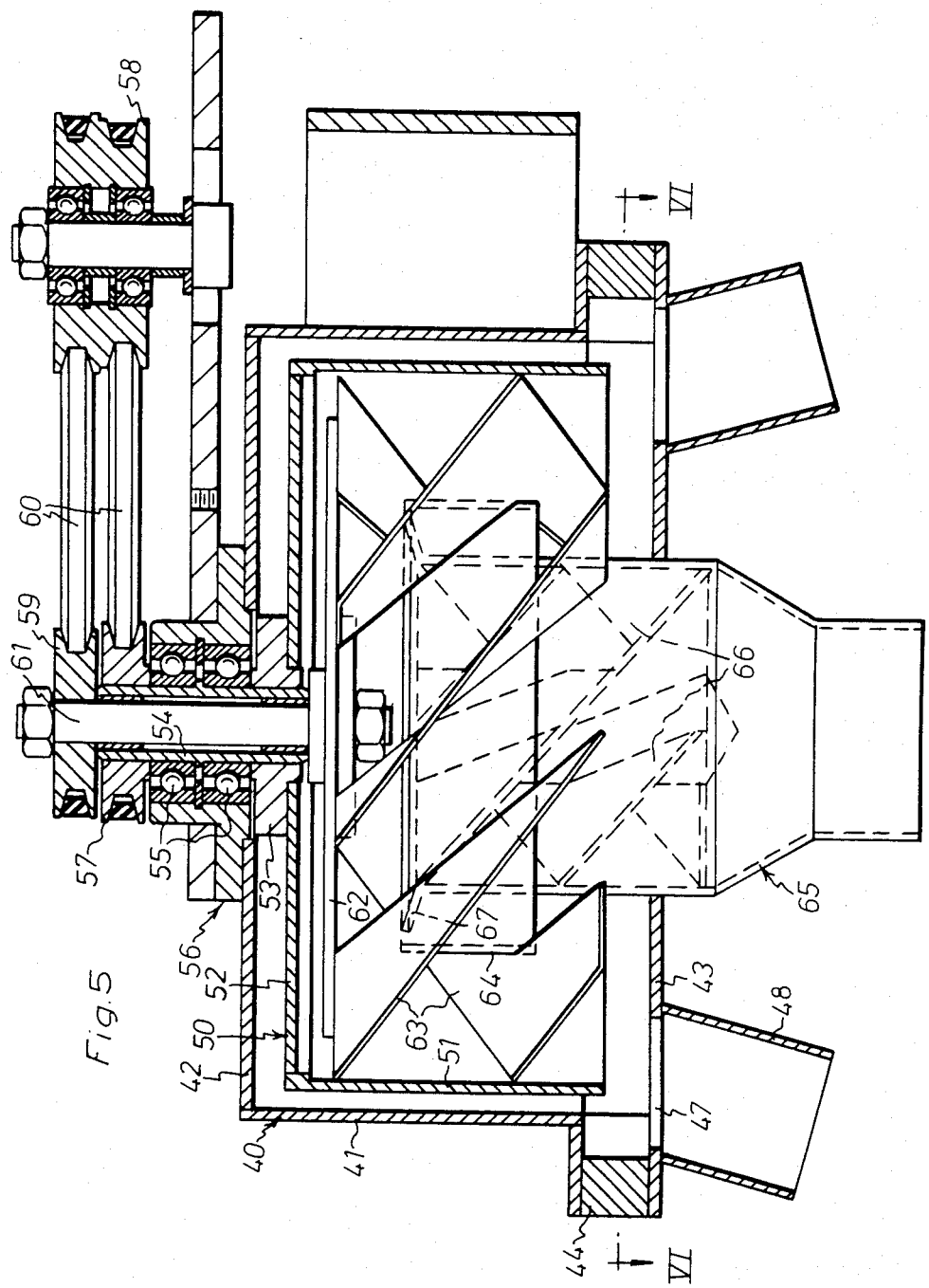

METHOD AND APPARATUS FOR SPREADING AND DISTRIBUTING A SOLID OR LIQUID PARTICULATE MATERIAL

The present invention relates to a method and an apparatus for spreading and distributing a solid or liquid particulate material which is supplied in the form of a pneumatically conveyed flow of material.

It is well known that granular, pulverulent or liquid material which is fed through a conduit in the form of a pneumatically conveyed flow of material, is not uniformly distributed over the entire cross-sectional area of the conduit, but mostly is concentrated to areas adjacent the conduit wall. Various arrangements have therefore been proposed for uniformly spreading and distributing the conveyed material when this is to be supplied to different points of consumption or spread over large areas. One such arrangement is disclosed by Swedish Patent No. 331,606 where the pneumatically conveyed flow of liquid material is rotated by means of a baffle and introduced into a space within which a ball is caused to rotate in order to distribute the flow of material reasonably uniformly to a distribution chamber from which a number of outlets extend. This arrangement has been shown to operate more efficiently than other arrangements known at that time for spreading liquid materials. On the other hand, the arrangement is not especially suited for spreading granular or pulverulent materials conveyed by pneumatic means.

Swedish Patent No. 329,294 discloses another arrangement for providing a distribution of a pneumatically conveyed flow of material, i.e. pneumatically conveyed grain and/or granular fertilizers. However, this arrangement has been shown to give an insufficiently uniform distribution of the material and is not suited for the distribution of liquid material.

Danish Patent No. 131,261 relates to an apparatus for distributing liquid ammonia to a number of outlets, and in this apparatus a mixture of liquid and gaseous ammonia is supplied to the interior of a turbine wheel through the outlet of which the ammonia flows and causes the turbine wheel to rotate so that the ammonia is distributed over a number of outlets provided around the periphery of the turbine wheel. Also in this prior art apparatus, the liquid is not sufficiently accurately distributed over the different outlets, and furthermore, the apparatus can be used only for ammonia and other gasifiable liquids and, thus, not for the distribution of granular or pulverulent materials.

The prior art arrangements thus are inadequate in that their usefulness is restricted either to liquid materials alone or merely to granular or pulverulent materials. Above all, however, the prior art arrangements have been unable to provide a sufficiently uniform distribution of the material supplied to the different outlets. The present invention aims at obviating the last-mentioned disadvantage and to provide means by which a highly uniform spreading and distribution of the supplied material is made possible.

The invention is based upon the idea that, in order to separate a solid or liquid particulate material from a pneumatically conveyed flow of material, and in order to spread and distribute the separated material, the flow of material is to be introduced, preferably after it has been set in rotary motion, into a centrifugal chamber for centrifugal separation of the solid or liquid particulate material and for collecting the material in a buffer store from which it is flung in a plane perpendicular to the axis of rotation of the centrifugal chamber. The uniform distribution is achieved by effecting the discharge from the buffer store under rotation, whereby irregularities in the discharge will be distributed uniformly over the different outlets. It is especially advantageous if there is imparted to the separated material an axial component of motion along the circumference of the centrifugal chamber so that the material is gradually discharged over the terminal edge of the centrifugal chamber, which serves as an overflow and from which the material is flung towards one or more outlets through which it is discharged. According to the present invention, an apparatus for carrying the method into effect comprises a centrifugal chamber operable by means of the conveying air to bring about the contemplated centrifugal separation. The terminal edge of the circumference of the centrifugal chamber serves as an overflow to establish a buffer store and has flowretarding, inwardly directed flanges. A baffle may be provided around the terminal edge for intercepting material flung out and conducting it, via hopper-like flowretarding recesses, to different outlets provided around the terminal edge. The apparatus preferably comprises a rotation generator by which the flow material is set in rotary motion prior to entry into the centrifugal chamber.

The invention will be more fully described in the following, reference being had to the accompanying drawings illustrating three embodiments of an apparatus according to the invention. In the drawings:

FIG. 1 is an axial section through an embodiment of an apparatus according to the invention;

FIG. 2 is a section along line II—II in FIG. 1;

FIG. 3 is an axial section through another embodiment of an apparatus according to the invention;

FIG. 4 is a section along line IV—IV in FIG. 3;

FIG. 5 is an axial section of a third embodiment of an apparatus according to the invention; and FIG. 6 is a section along line VI—VI in FIG. 5.

The apparatus illustrated in FIGS. 1 and 2 has an inlet 10 which is connected to a pneumatic conveyor line and through which a pneumatically conveyed flow of material thus is introduced. The inlet 10 opens into a cylindrical bore 11 in a housing 12. The housing 12 has two cylindrical walls 13, 14 (downwardly directed in the drawing) defining a space 15. The inner side of the inner wall 13 is a direct extension of the bore 11. A cylindrical disk 16 is inserted in the cylindrical bore 11 and has, at its periphery, oblique recesses 17 which thus form a communication between the bore 11 and the space 15.

A journal 18 is secured to the lower side of the disk, and a rotor 20 is rotatably mounted on the journal 18 by means of a ball bearing 19. The rotor 20 has a cylindrical bottom hole 21 which, in the drawing, is facing upwardly. The other end of the rotor has a cylindrical bottom hole 22 of a diameter greater than that of the bottom hole 21. The bottom holes are interconnected by means of a series of small bottom holes 23 which only partially penetrate into the bottom hole 21 and between which partitions or vanes 24 are thus formed.

A circumferential inwardly directed flange 25 is provided at the lower end of the bottom hole 22. The journal 18 also carries a deflector disk 26 which is stationary and located at a distance from the flange 25 to define, together with said flange, an outlet gap 27.

The embodiment, illustrated in FIGS. 1 and 2, of the apparatus according to the invention operates as follows. The pneumatically conveyed flow of material is introduced axially into the bore 11 and flows through the oblique recesses 17 down into the space 15, whereby the flow of material is set in rotary motion. The rotating flow of material impinges upon the vanes 24 of the rotor 20 and causes the rotor to rotate. The rotary speed will be so high that the solid or liquid material in the pneumatically conveyed flow of material will be separated, by centrifugal force, from the air or gas and will flow along the outer wall of the rotor down into the bottom hole 22 and, after some delay (perhaps a fraction of a second), will flow over the flange 25 so that the separated material is spread in the form of a uniformly distributed liquid or particle spray around the entire rotor. By designing the rotor 20 in this manner, one thus obtains a buffer storage of the separated material so that the flow of material to the overflow will be equalized before the material is flung over the flange 25.

According to the invention, it has been found that the provision of a buffer storage through a slight retardation of the flow of material through the rotor results in a highly uniform distribution of the flow outwards from the lower edge of the rotor 20 serving as an overflow. The time retardation or the buffer storage of the material is accomplished, in the embodiment illustrated, by the downward movement of the material along the inner side of the rotor 20 and by the provision of the flange 25. Also the step of setting the flow of material in rotary motion prior to entry into the rotor gives an improved separation of the material and an improved distribution thereof.

Figure 2:
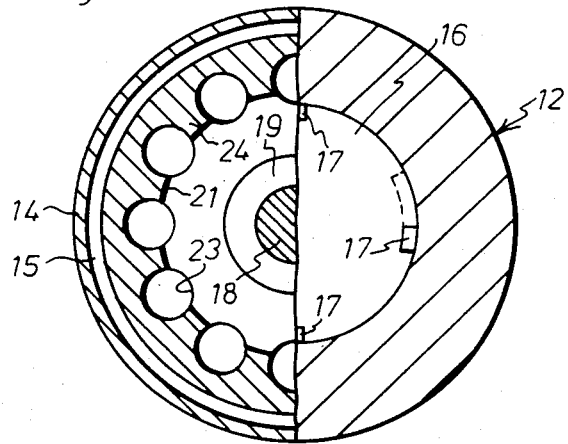

The apparatus shown in FIGS. 1 and 2 need not be oriented in the manner illustrated, but functions just as well if it is inverted with the inlet pointing downwards and the outlet gap 27 pointing upwards, or if it is turned in some other manner. The function depends upon the centrifugal forces and thus is independent of the manner in which the apparatus is oriented.

The apparatus shown in FIGS. 1 and 2 spreads and distributes the supplied material uniformly around the entire periphery of the apparatus. FIGS. 3 and 4 show an embodiment in which the material instead is distributed uniformly to a number of separate outlets.

The embodiment shown in FIGS. 3 and 4 is, in principle, designed in the same manner as the embodiment according to FIGS. 1 and 2. For like components, the same reference numerals have therefore been used. In FIGS. 3 and 4, however, the housing 12 is formed by a cover member 31 and a separate outer wall 32 replacing the outer wall 14 in the embodiment according to FIGS. 1 and 2. The journal 18 is shorter in the embodiment according to FIGS. 3 and 4. Furthermore, the embodiment shown in FIGS. 3 and 4 has recesses 33 in the flange 25.

In the embodiment according to FIGS. 3 and 4, an end wall 34 is secured to the outer wall 32 and has a number of axially directed outlet holes 35 distributed around the periphery and connected each to one outlet pipe 36. The upwardly directed circumferential flange 37 of the end wall 34, which is connected to the outlet wall 34, has been formed as a baffle with oblique surface portions 38 each directed tangentially against one outlet hole 35 and having a wall portion 39 following its circumference. The wall portions 38 and 39 will thus form "inlet hoppers" conducting the liquid or pulverulent material into the outlet holes 35.

The apparatus shown in FIGS. 3 and 4 operates as follows. After the pneumatically conveyed flow of material has been set in rotary motion by the oblique recesses 17 in the disk 16, and after the solid or liquid material has been separated by centrifugation in the rotor 20, the material is uniformly distributed along the circumference of the flange 37 so that the material is collected by the oblique wall portions 38 and is forced by the wall portions 39 down into the respective outlet holes 35. By the provision of the recesses 33 in the flange 25, the centrifugally separated flow of material from the rotor 20 will be concentrated through these recesses, and by the rotation of the rotor the distribution over the different outlet holes 35 will be uniform. In other respects, the apparatus functions in the same manner as the apparatus shown in FIGS. 1 and 2.

Figure 6:
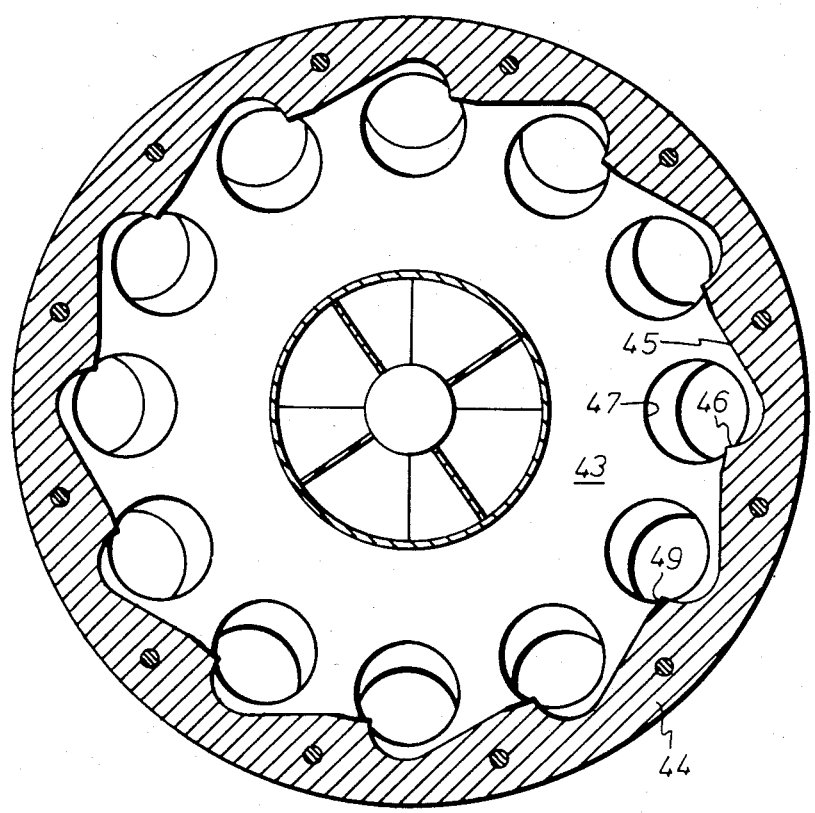

The embodiment shown in FIGS. 5 and 6 of the apparatus according to the invention is different from the embodiments according to FIGS. 1-4 but operates in accordance with the same principle, i.e. centrifugal separation of material from a pneumatically conveyed air flow and distribution of the material centrifugally separated.

The apparatus according to FIGS. 5 and 6 has a stationary housing 40 with a cylindrical wall 41 which is closed at one end by a disk 42 and at its other end by a disk 43. A guide vane 44 is inserted between the disk 43 and the wall portion 41. The guide vane is formed approximately in the same manner as the baffle 37, 39 in FIG. 4 and serves the same purpose. The baffle or guide vane 44 thus has oblique wall portions 45 and deflected wall portions 46. The disk 43 has holes 47 opening into outlet pipes 48. The holes 47 have a slightly greater radius than the curved wall portions 46 so that these wall portions extend in over the holes 47 with tips 49.

A rotor 50 is mounted for rotation in the housing 40. The rotor has a cylindrical wall 51 and an end wall 52. The end wall 52 is connected to a hub 53 secured to a tubular shaft 54. The shaft 54 is mounted, by means of two ball bearings 55, in a bearing box 56 secured to the end wall 42. The shaft 54 projects from the bearing box and carries at its projecting end a pulley 57. The pulley 57 and the pulleys 58, 59 form together with the V-belts 60 a power transmission between a journal 61 and the tubular shaft 54. The journal 61 is rotatably mounted in the tubular shaft 54 and is connected, at its lower end, to a disk 62 which serves as an upper attachment for a number of helical blades 63 distributed around the circumference of the disk 62 and acting, with their outer edges, against the cylindrical wall 51 of the rotor 50. The helical blades 63 are connected at their radially inner ends to a cylindrical wall 64.

Extending through the lower end wall of the housing 40 is an inlet pipe 65 which has a number of inner helical blades 66 and is open at its upper end so that a pneumatically conveyed flow of material will be set in rotary motion by the blades 66 and fed over the edge 67 into the rotor 50 where it comes into contact with the helical blades 63 and causes the latter to rotate, the rotary force being transmitted to the rotor 50 via the shaft 61, the belts 60 and the pulleys 57 and 58, and the tubular shaft 54. The transmission ratio of the pulleys causes the rotor 50 to rotate in the same direction as the helical blades 63, but at a slightly lower speed so that the helical blades 63 positively scrape the material separated by the centrifugal force downwardly along the wall 51 and out over the lower edge thereof. The material thus discharged by the rotor will be intercepted by the vane 44 and will be guided thereby down into the different outlets 47, 48.

As in the embodiments previously described, a centrifugal separation of the pneumatically conveyed material occurs, and the centrifugally separated material will be scraped out from the wall 51, with a retardation building up a buffer store, and flung towards the outlet holes.

As will appear from the above, the method according to the present invention implies that the flow of material is introduced into a rotary centrifugal chamber for centrifugal separation therein of the solid or liquid particulate material, and that a buffer store is established to equalize the flow of material before it is flung out in a plane perpendicular to the axis of rotation of the centrifugal chamber. The buffer store preferably is established in that an axial component of motion is imparted to the separated material for successively moving the material along the circumference of the centrifugal chamber so that the material is moved towards the terminal edge of the circumference serving as an overflow. From this terminal edge, the material is flung radially outwardly to a circumferential outlet (FIGS. 1 and 2) or several outlets located in the form of a ring around the terminal edge (FIGS. 3-6). According to the invention it is especially advantageous to intercept the material which is flung radially outwardly from the terminal edge of the centrifugal chamber by means of a circumferential baffle as in the embodiments according to FIGS. 3-6, because the material in this manner can be distributed uniformly over a number of different outlets. Furthermore, it is especially advantageous according to the invention if the pneumatically conveyed flow of material is set in rotary motion prior to entry into the centrifugal chamber.

In the embodiments described above, the centrifugal chamber is caused to rotate by means of the pneumatically conveyed flow of material which is set in rotary motion and which, in the embodiments according to FIGS. 1-4, preferably contains liquid material, but in the embodiments according to FIGS. 5-6 contains particulate, solid material. It is possible, within the scope of the invention, to provide this rotation by mechanical means. It is also within the scope of the invention to use a gas other than air for conveying the material supplied. By the term conveying air is thus meant also any other gas which is used for conveying solid material or liquid, for instance the evaporated part of anhydrous ammonia.

In the apparatus according to the invention, it is specially advantageous if the flow of the separated material to the overflow edge of the rotor is supported. In the embodiment according to FIGS. 5 and 6, this is done entirely mechanically by means of the conveyor screw arrangement 63, and in the embodiments according to FIGS. 1 and 2 and FIGS. 3 and 4 by means of the successively increasing diameter of the inner space of the rotor 20 from the bore 11 via the bores 23 to the bore 22 so that the separated material will flow "downhill" under the action of the centrifugal force. This flow also provides for an improved equalization of the material flow exiting from the rotor.

The distributing apparatus according to the invention may be used for, inter alia seed sowing machines, fertilizer distributors and agricultural spraying machines. Trials have shown that the distributor functions satisfactorily in the distribution of widely different quantities of material per unit of time. The distributor for solid material operates advantageously at speeds in the order of 1000 r.p.m., while the distributor for liquid should rotate at a speed which is approximately twice as high. The speed of the liquid distributor should be made adjustable, thereby making it possible to control the size of the drops ejected from the rotor.

I claim:

1. A method for spreading and distributing a solid or liquid particulate material which is supplied in the form of a flow of material pneumatically conveyed by a conveying gas, comprising the steps of directing the conveying gas containing the material into a centrifugal chamber in a separator having a buffer store and at least one exit point, centrifuging the material in said chamber to separate the material by centrifugation from the conveying gas, collecting the material in the buffer store, conducting the material from said buffer store to said at least one exit point in the separator, and flinging it out in a plane perpendicular to the axis of rotation of the centrifugal chamber.

2. A method as claimed in claim 1, wherein the separator includes a wall surrounding the centrifugal chamber and having a plurality of openings therein positioned such that the material that is flung out from the centrifugal chamber is intercepted in said openings.

3. A method as claimed in claim 1, wherein the centrifugal chamber is positioned and arranged so as to be rotated by the conveying gas.

4. A method as claimed in claim 1, including exit deflecting means positioned adjacent said buffer store, so that the movement of the separated material from the buffer store to the at least one exit point in the centrifugal chamber is impeded by said deflecting means.

5. A method as claimed in claim 4, wherein the deflecting means includes a mechanical conveying means causes the separated material from the buffer store to the exit point in the centrifugal chamber to be impeded.

6. A method as claimed in claim 5, wherein the deflecting means includes at least one oblique member, the separated material being impeded by said at least one oblique member, said at least one oblique member being positioned and arranged against the circumference of the centrifugal chamber so as to rotate relative thereto.

7. A method as claimed in claim 1, wherein the pneumatically conveyed flow of material is set in rotary motion prior to its entry into the rotating centrifugal chamber.

8. A method as claimed in claim 1, wherein the chamber has a circumference and an axial component of motion is imparted to the material separated in the centrifugal chamber for successively moving the material along the circumference of the centrifugal chamber before the material is flung out in a plane perpendicular to the axis of rotation of the centrifugal chamber.

9. An apparatus for separating, spreading and distributing a solid or liquid particulate material introduced into the apparatus as a flow of material pneumatically conveyed by a conveying gas, said apparatus comprising an inlet for the pneumatically conveyed flow of said solid or liquid particulate material, a rotor arrangement, and at least one outlet in said rotor arrangement, said rotor arrangement being positioned and arranged so as to separate said material from the conveying gas and distribute the particulate material into said at least one outlet, wherein the rotor arrangement is a centrifugal chamber having a circumference and in flow communication with said inlet, said chamber comprising a cylinder having a circumference and a terminal edge positioned and arranged to provide a buffer storage space from which the separated material is flung out in a plane perpendicular to the axis of rotation of the centrifugal chamber.

10. An apparatus as claimed in claim 9, wherein the apparatus has a rotation generator means positioned and arranged to impart to the flow of conveying gas and material a rotary motion prior to the conveying gas and material entering into the centrifugal chamber.

11. An apparatus as claimed in claim 9, wherein the at least one outlet comprises a plurality of outlets and wherein a baffle is provided around the terminal edge of the centrifugal chamber, said baffle having a series of hopper-like flow-impeding recesses distributed along the baffle side facing the centrifugal chamber, at which recesses the outlets are provided.

12. An apparatus as claimed in claim 9, wherein the circumference of the centrifugal chamber has inwardly directed flange means for retarding the motion of the solid or liquid particulate material separated by centrifugal separation.

13. An apparatus as claimed in claim 9, wherein the centrifugal chamber is provided with inclinded baffle means positioned and arranged so as to be actuated by the incoming conveying gas so as to impart rotary motion to the centrifugal chamber.

14. An apparatus as claimed in claim 9, wherein a conveying device comprising at least one oblique member is provided in the centrifugal chamber and is positioned and arranged so as to rotate relative thereto for supporting the movement of the material separated therein.

* * * * *